United States Patent

Niwamoto

[11] Patent Number: 6,134,347
[45] Date of Patent: Oct. 17, 2000

[54] IMAGE FILMING AND COMPRESSION SYSTEM, IMAGE FILMING AND COMPRESSION METHOD, AND RECORDING MEDIUM STORING PROCESSING PROGRAM THEREFOR

[75] Inventor: Hiroaki Niwamoto, Nara, Japan

[73] Assignee: Sharp Kabushiki Kaisha, Osaka, Japan

[21] Appl. No.: 09/118,227

[22] Filed: Jul. 20, 1998

[30] Foreign Application Priority Data

Sep. 30, 1997 [JP] Japan ..................................... 9-266980

[51] Int. Cl.[7] ........................................................ G06K 9/00
[52] U.S. Cl. ........................ 382/166; 382/162; 382/248; 386/109; 348/273; 348/395
[58] Field of Search ..................... 382/166, 162, 382/248; 348/395, 403–408, 277–280, 266, 663, 273, 223, 675; 358/515–516, 518, 512, 527, 530, 426, 462; 386/109, 112

[56] References Cited

U.S. PATENT DOCUMENTS

| | | | |
|---|---|---|---|
| 4,415,923 | 11/1983 | Noda | 348/675 |
| 5,202,756 | 4/1993 | Sasaki et al. | 348/223 |
| 5,422,736 | 6/1995 | Katayama | 358/426 |
| 5,434,623 | 7/1995 | Coleman et al. | 348/405 |
| 5,648,818 | 7/1997 | Fukatsu | 348/273 |
| 5,699,475 | 12/1997 | Oguro et al. | 386/109 |
| 5,737,017 | 4/1998 | Udagawa et al. | 348/280 |
| 5,825,935 | 10/1998 | Murakoshi | 382/248 |

FOREIGN PATENT DOCUMENTS

| | | | |
|---|---|---|---|
| 0 502 539 A2 | 9/1992 | European Pat. Off. | H04N 9/04 |
| 7-067129 | 3/1995 | Japan | H04N 9/67 |

*Primary Examiner*—Leo H. Boudreau
*Assistant Examiner*—Ishrat Sherali

[57] ABSTRACT

An image filming and compression system includes a color complementary filter having a predetermined color arrangement; a CCD for generating image data for output according to the light of an object received via the color complementary filter; block forming circuit for dividing the image data into blocks; and image data converter circuit for calculating spatial frequency components of a luminance signal and color difference signals for each block according to the image data. The image data converter circuit directly calculates the spatial frequency components of the luminance signal and the color difference signals by conducting the only linear transformation on the image data. This obviates the need for a means to generate the luminance signal and the color difference signals according to which the spatial frequency components of the luminance signal and the color difference signals are calculated. Consequently, it becomes possible to conduct the processes from the image filming of the object to the compression of the image data with high efficacy, and hence to reduce the size of the system.

10 Claims, 12 Drawing Sheets

FIG. 2

| | HORIZONTAL | | | | | | | | | | | | |
|---|---|---|---|---|---|---|---|---|---|---|---|---|---|
| | 1 | 2 | ... | 7 | 8 | 9 | 10 | ... | 15 | 16 | 17 | 18 | ... 23 24 25 ... |
| 1 | Ma | G | ... | Ma | G | Ma | G | ... | Ma | G | Ma | G | ... Ma G ... ... |
| 2 | Cy | Ye | ... | Cy | Ye | Cy | Ye | ... | Cy | Ye | Cy | Ye | ... Cy Ye ... ... |
| 3 | Ma | G | ... | Ma | G | Ma | G | ... | Ma | G | Ma | G | ... Ma G ... ... |
| 4 | Ye | Cy | ... | Ye | Cy | Ye | Cy | ... | Ye | Cy | Ye | Cy | ... Ye Cy ... ... |
| ... | | | | | | | | | | | | | |
| 13 | Ma | G | ... | Ma | G | Ma | G | ... | Ma | G | Ma | G | ... Ma G ... ... |
| 14 | Cy | Ye | ... | Cy | Ye | Cy | Ye | ... | Cy | Ye | Cy | Ye | ... Cy Ye ... ... |
| 15 | Ma | G | ... | Ma | G | Ma | G | ... | Ma | G | Ma | G | ... Ma G ... ... |
| 16 | Ye | Cy | ... | Ye | Cy | Ye | Cy | ... | Ye | Cy | Ye | Cy | ... Ye Cy ... ... |
| 17 | Ma | G | ... | Ma | G | Ma | G | ... | Ma | G | Ma | G | ... Ma G ... ... |
| 18 | Cy | Ye | ... | Cy | Ye | Cy | Ye | ... | Cy | Ye | Cy | Ye | ... Cy Ye ... ... |
| 19 | Ma | G | ... | Ma | G | Ma | G | ... | Ma | G | Ma | G | ... Ma G ... ... |
| 20 | Ye | Cy | ... | Ye | Cy | Ye | Cy | ... | Ye | Cy | Ye | Cy | ... Ye Cy ... ... |
| ... | | | | | | | | | | | | | |
| 29 | Ma | G | ... | Ma | G | Ma | G | ... | Ma | G | Ma | G | ... Ma G ... ... |
| 30 | Cy | Ye | ... | Cy | Ye | Cy | Ye | ... | Cy | Ye | Cy | Ye | ... Cy Ye ... ... |
| 31 | Ma | G | ... | Ma | G | Ma | G | ... | Ma | G | Ma | G | ... Ma G ... ... |
| 32 | Ye | Cy | ... | Ye | Cy | Ye | Cy | ... | Ye | Cy | Ye | Cy | ... Ye Cy ... ... |
| 33 | | | | | | | | | | | | | |
| 34 | | | | | | | | | | | | | |

VERTICAL ↓

| | 1 | 2 | 3 | 4 | 5 | 6 | 7 | 8 | |
|---|---|---|---|---|---|---|---|---|---|
| 8 | Cy | Ye | Cy | Ye | Cy | Ye | Cy | Ye | .... |
| 7 | G | W | G | W | G | W | G | W | .... |
| 6 | Ye | Cy | Ye | Cy | Ye | Cy | Ye | Cy | .... |
| 5 | W | G | W | G | W | G | W | G | .... |
| 4 | Cy | Ye | Cy | Ye | Cy | Ye | Cy | Ye | .... |
| 3 | G | W | G | W | G | W | G | W | .... |
| 2 | Ye | Cy | Ye | Cy | Ye | Cy | Ye | Cy | .... |
| 1 | W | G | W | G | W | G | W | G | .... |
| | 1 | 2 | 3 | 4 | 5 | 6 | 7 | 8 | .... |

FIG. 9

|     |     |     |     |     |     |     |     |
|-----|-----|-----|-----|-----|-----|-----|-----|
| Ma  | G   | Ma  | G   | Ma  | G   | Ma  | G   |
| Cy  | Ye  | Cy  | Ye  | Cy  | Ye  | Cy  | Ye  |
| Ma  | G   | Ma  | G   | Ma  | G   | Ma  | G   |
| Ye  | Cy  | Ye  | Cy  | Ye  | Cy  | Ye  | Cy  |
| Ma  | G   | Ma  | G   | Ma  | G   | Ma  | G   |
| Cy  | Ye  | Cy  | Ye  | Cy  | Ye  | Cy  | Ye  |
| Ma  | G   | Ma  | G   | Ma  | G   | Ma  | G   |
| Ye  | Cy  | Ye  | Cy  | Ye  | Cy  | Ye  | Cy  |

| W | Ye | G | Cy |
|---|----|---|----|
| G | Cy | W | Ye |
| W | Ye | G | Cy |
| G | Cy | W | Ye |

IMAGE FILMING AND COMPRESSION SYSTEM, IMAGE FILMING AND COMPRESSION METHOD, AND RECORDING MEDIUM STORING PROCESSING PROGRAM THEREFOR

FIELD OF THE INVENTION

The present invention relates to an image filming and compression system for filming images of objects and executing a compression process on image data obtained by the filming, an image filming and compression method for the same, and a recording medium storing a processing program for the same.

BACKGROUND OF THE INVENTION

Nowadays, intensive research is being conducted on image filming apparatuses including surveillance cameras and video conferencing cameras. A typical image filming apparatus is equipped with a solid state image sensor (or a charge coupled device; hereinafter, will be abbreviated as a CCD) for receiving light from an object and generating electric signals (image signals) for output according to the amount of light received, the electric signals being transmitted externally as image data.

For better efficacy in the transmission of the image data, the image data normally is transmitted externally only after passing through an image data compression or other processing apparatus. The image data compression apparatus conducts a compression process on incoming image data according to a standard such as JPEG (Joint Photographic Expert Group) or MPEG (Moving Picture Expert Group) and transmits processed image data externally.

Conventional image filming apparatuses generate color difference signals Cr and Cb, which are coupled to the input of the image data compression apparatus, by temporarily converting image data obtained by filming into R (red), G (green), and B (blue) signals through a matrix calculation, and thereafter carrying out another matrix calculation on those color signals. Consequently, the inclusion of matrix calculation means in such apparatuses is essential to generate the R, G, and B signals, which results in increased complexity of the configuration of the apparatuses.

To solve the problem, Japanese Laid-Open Patent Application No. 7-67129/1995 (Tokukaihei 7-67129) discloses an image filming apparatus for directly generating color difference signals Cr and Cb without calculating R, G and B signals as follows. An image signal output of a CCD is separated into a luminance signal and a color signal by a Y/C separator circuit. The color difference signals Cr and Cb are then generated by conducting a single matrix calculation on these signals.

The arrangement obviates the need for matrix calculation means for generating the R, G, and B signals, making the overall configuration of the system less complex and facilitating the tuning when a multiplier determines a coefficient due to the decreased number of parameters for the matrix calculation. The following description will explain a system incorporating such an image filming apparatus and an image data compression apparatus for compressing the image data transmitted from the image filming apparatus.

As shown in FIG. 8, an image filming apparatus 51 includes a color complementary filter 52, a CCD 53, and a color separator circuit 54.

FIG. 9 shows an example of the configuration of the color complementary filter 52, in which Ma (magenta), Ye (yellow), Cy (cyan), and G (green) color filters are arranged in a predetermined pattern. The color complementary filter 52 is placed in front of the CCD 53 so that light from an object passes through the color complementary filter 52 before entering the CCD 53.

FIG. 11 shows another example of the configuration of the color complementary filter 52, in which W (white), Ye (yellow), Cy (cyan), and G (green) color filters are arranged in a predetermined pattern.

The CCD 53 receives light that travels from the object via the color complementary filter 52 and generates electric signals for output according to the amount of light received. The CCD 53 includes a light receiving element (pixel) for each color filter of the color complementary filter 52. The output of the light receiving element is coupled to the input of the color separator circuit 54 as image data. The method of reading the image data by the pixels of the CCD 53 is determined based on the color complementary filter 52 used.

The color separator circuit 54 is for generating a luminance signal Y and color difference signals Cr and Cb according to an electric signal output of the CCD 53. The principle in the generation of the luminance signal Y and the color difference signals Cr and Cb will be explained later. The luminance signal Y and the color difference signals Cr and Cb are coupled to the input of a block forming circuit 62 of an image data compression apparatus 61.

The image data compression apparatus 61 includes the block forming circuit 62, a DCT circuit 63 and a data compressing circuit 64.

The block forming circuit 62 is for dividing the luminance signal Y and the color difference signals Cr and Cb generated by the color separator circuit 54 into a plurality of blocks. For example, according to the JPEG standard, one block is constituted by eight horizontal signals and eight vertical signals, i.e. 8×8 signals (8×8 pixels) as a unit in each of the luminance signal Y and the color difference signals Cr and Cb.

The DCT circuit 63 is for conducting a discrete cosine transform (hereinafter, will be referred to as a DCT transform), which is a kind of orthogonal transform, on the luminance signal Y and the color difference signals Cr and Cb in a block. As a result, those signals are converted into data (DCT coefficients) on spatial frequency components. Generally, the DCT transform is represented by Equation 1. Note that in Equation 1, m and n denote the horizontal and vertical positions of the DCT coefficient respectively, and i and j denote the positions of the luminance signal Y and the color difference signals Cr and Cb respectively.

$$F_{mnij} = \frac{1}{4} C_m C_n \cos\frac{(2i+1)m\pi}{16} \cos(2i+1)n\frac{\pi}{16} \quad \text{(Equation 1)}$$

where m and n represent the positions of the DCT coefficients.

$$C_m C_n = \begin{cases} \frac{1}{\sqrt{2}} & (m, n = 0) \\ 1 & (m, n \neq 0) \end{cases}$$

The data compressing circuit 64 is for quantizing each DCT coefficient generated by the DCT circuit 63 and carrying out a run length encoding and a Huffman coding after zigzag-scanning the quantized DCT coefficients.

The description below will explain how the system operates. First, let us define some terms used in the description for a clear and easy understanding of the description.

FIG. 10 schematically shows the light receiving plane of the CCD 53. Ma, Cy, Ye, and G represent pixels receiving light that has passed through the Ma, Cy, Ye, and G color filters of the color complementary filter 52. The coordinates of the pixel Ma at the top left corner is denoted as (0,0), and that of the pixel X distanced from the pixel Ma by p vertically and by q horizontally as (p,q). The output of the pixel X is denoted as $X_{pq}$.

The luminance signal Y and the color difference signals Cr and Cb are obtained according to the outputs of four adjacent pixels. So let us presume that the luminance signal Y and the color difference signals Cr and Cb are outputted at the lattice point formed by the four pixels, and for convenience in explanation that the coordinates of the top left lattice point, surrounded by the pixels (p,q)=(0,0), (1,0), (1,1), and (0,1), are (0,0). Under the presumptions, the coordinates of the lattice point distanced from the lattice point (0,0) by i vertically and by j horizontally as (i,j), and the luminance signal Y and the color difference signals Cr and Cb outputted at that lattice point are denoted as the luminance signal $Y_{ij}$ and the color difference signals $Cr_{ij}$ and $Cb_{ij}$.

If the color complementary filter 52 shown in FIG. 9 is used, the data produced by the pixels of the CCD 53 is read in a two line addition reading method, and the lattice points exist in every other horizontal row as shown in FIG. 10. By contrast, if the color complementary filter 52 shown in FIG. 11 is used, the data produced by the pixels of the CCD 53 is read in a total independent pixel reading method, and the lattice points exist in every horizontal row as shown in FIG. 12, unlike the case where the color complementary filter 52 shown in FIG. 9 is used.

With the configuration, as the light from the object passes through predetermined color filters of the color complementary filter 52 and enters CCD 53, the light receiving element of the CCD 53, having received the light, generates electric signals for output to the color separator circuit 54 according to the amount of light received. The color separator circuit 54 generates the luminance signal Y and the color difference signals Cr and Cb for output to the block forming circuit 62 according to the principle detailed below.

If the color complementary filter 52 shown in FIG. 9 is used, generally, the Ma, Cy, Ye, and G signals are expressed by Equations 2 using the R, G, and B signals:

$$Ma=R+B$$
$$Ye=R+G$$
$$Cy=G+B$$
$$G=G \quad \text{(Equations 2)}$$

The luminance signal Y, and the color difference signals $C^1$ and $C^2$ are expressed by Equations 3 using the Ma, Cy, Ye, and G signals:

$$7Y=Ma+Ye+Cy+G$$
$$C^1=Ma+Ye-Cy-G$$
$$C^2=Ma-Ye+Cy-G \quad \text{(Equations 3)}$$

By substituting Equations 2 in the right sides of Equations 3, Equations 4 are obtained.

$$7Y=2R+3G+2B$$
$$C^1=2R-G$$
$$C^2=2B-G \quad \text{(Equations 4)}$$

From Equations 4, the G signal is expressed by Equation 5 using the luminance signal Y and the color difference signals $C^1$ and $C^2$:

$$G=(7Y-C^1-C^2)/5 \quad \text{(Equation 5)}$$

The color difference signals Cr and Cb generally are expressed by Equations 6 using the luminance signal Y:

$$Cr=R-Y$$
$$Cb=B-Y \quad \text{(Equations 6)}$$

Therefore, Equations 7 are obtained from Equations 4 and Equations 6.

$$Cr=(C^1+G)/2-Y$$
$$Cb=(C^2+G)/2-Y \quad \text{(Equations 7)}$$

By substituting Equation 5 in Equations 7, Equations 8 are obtained.

$$Cr=(1/10-1/7)\cdot 7Y+(1/2-1/10)\cdot C^1-(1/10)\cdot C^2$$
$$Cb=(1/10-1/7)\cdot 7Y-(1/10)\cdot C^1+(1/2-1/10)\cdot C^2 \quad \text{(Equations 8)}$$

Finally, Equations 9 are obtained from Equations 3 and Equations 8.

$$Y=(Ma+Ye+Cy+G)/7$$
$$Cr=(1/10-1/7)\cdot(Ma+Ye+Cy+G)+(4/10)\cdot(Ma+Ye-Cy-G)-(1/10)\cdot(Ma-Ye+Cy-G)$$
$$Cb=(1/10-1/7)\cdot(Ma+Ye+Cy+G)-(1/10)\cdot(Ma+Ye-Cy-G)+(4/10)\cdot(Ma-Ye+Cy-G) \quad \text{(Equations 9)}$$

Therefore, from Equations 9, the luminance signal $Y_{01}$ and the color difference signals $Cr_{01}$ and $Cb_{01}$ are expressed by Equations 10:

$$Y_{01}=(Ma_{02}+Ye_{11}+Cy_{12}+G_{01})/7$$
$$Cr_{01}\times(1/10-1/7)\cdot(Ma_{02}+Ye_{11}+Cy_{12}+G_{01})+(4/10)\cdot(Ma_{22}+Ye_{32}-Cy_{31}-G_{21})-(1/10)\cdot(Ma_{02}-Ye_{11}Cy_{12}-G_{01})$$
$$Cb_{01}=(1/10-1/7)\cdot(Ma_{02}+Ye_{11}+Cy_{12}+G_{01})-(1/10)\cdot(Ma_{22}+Ye_{32}-Cy_{31}-G_{21})+(4/10)\cdot(Ma_{02}-Ye_{11}+Cy_{12}-G_{01}) \quad \text{(Equations 10)}$$

Consequently, the luminance signal $Y_{01}$ and the color difference signals $Cr_{01}$ and $Cb_{01}$, which are outputs at the lattice point, are linear to the output of the pixels Ma, Cy, Ye, and G as shown in Equations 10. The luminance signal $Y_{ij}$ and the color difference signals $Cr_{ij}$ and $Cb_{ij}$ are expressed, for example, with matrixes $E^Y_{ijpq}$, $E^{Cr}_{ijpq}$, $E^{Cb}_{ijpq}$, and $X_{pq}$ by Equations 11:

$$Y_{01}=(Ma_{02}+Ye_{11}+Cy_{12}+G_{01})/7$$
$$Cr_{01}=(1/10-1/7)\cdot(Ma_{02}+Ye_{11}+Cy_{12}+G_{01})+$$
$$(4/10)\cdot(Ma_{22}+Ye_{32}-Cy_{31}-G_{21})-$$
$$(1/10)\cdot(Ma_{02}-Ye_{11}+Cy_{12}-G_{01}) \quad \text{(Equations 11)}$$

-continued $$Cb_{01} = (1/10 - 1/7) \cdot (Ma_{02} + Ye_{11} + Cy_{12} + G_{01}) -$$
$$(1/10) \cdot (Ma_{22} + Ye_{32} - Cy_{31} - G_{21}) +$$
$$(4/10) \cdot (Ma_{02} - Ye_{11} + Cy_{12} - G_{01})$$

where i and j each are any one of the integral numbers from 0 through 7, and p and q each are any one of the integral numbers from 0 through 8.

Next, as the block forming circuit 62 forms 8×8 signal blocks out of the luminance signal $Y_{ij}$ and the color difference signals $Cr_{ij}$ and $Cb_{ij}$, the DCT circuit 63 conducts the DCT transform expressed by Equation 1 on those signals in each block to convert them into spatial frequency components (DCT coefficients). Consequently, the spatial frequency components $Y_{mn}$, $Cr_{mn}$, and $Cb_{mn}$ of the luminance signal $Y_{ij}$ and the color difference signals $Cr_{ij}$ and $Cb_{ij}$ are expressed by Equations 12:

$$Y_{mn} = F_{mnij} \cdot Y_{ij}$$
$$Cr_{mn} = F_{mnij} \cdot Cr_{ij}$$
$$Cb_{mn} = F_{mnij} \cdot Cb_{ij} \quad \text{(Equations 12)}$$

Thereafter, the data compressing circuit 64 quantizes the DCT coefficients generated by the DCT circuit 63, zigzag-scans the quantized DCT coefficients, carrying out a run length encoding and a Huffman coding, and transmits compressed data externally.

By contrast, if the color complementary filter 52 shown in FIG. 11 is used, generally, the Y, B, and R signals are expressed by Equations 13 using W, Cy, Ye, and G signals:

$$Y = (W + Ye + Cy + G)/8$$
$$B = (W - Ye + Cy - G)/8$$
$$R = (W + Ye - Cy - G)/8 \quad \text{(Equations 13)}$$

If the total independent pixel reading method is adopted with the color complementary filter 52 shown in FIG. 11, the luminance signal Y is outputted at every lattice point, whereas the B and R signals are outputted respectively only at a lattice point with an even numbered j and an odd numbered j. So let us assume that at a lattice point with an odd numbered j, the same signal as the B signal calculated at the lattice point to its left (with an even numbered j) is outputted. In other words, it is assumed that $B_{(i,j=2m+1)} = B_{(i,j=2m)}$ (m is an integral number). Similarly, let us assume that at the lattice points with an even numbered j, the same signal as the R signal calculated at the lattice point to its left (with an odd numbered j) is outputted. In other words, it is assumed that $R_{(i,j=2n)} = R_{(i,j=2n-1)}$ (n is an integral number). Therefore, the signals $Y_{01}$, $B_{01}$ and $R_{01}$ are expressed by Equations 14:

$$Y_{01} = (W_{12} + Ye_{01} + Cy_{11} + G_{02})/8$$
$$B_{01} = B_{00} = (W_{00} - Ye_{01} + Cy_{11}G^{10})/2$$
$$R_{01} = (W_{12} + Ye_{01} - Cy_{11}G_{02})/8 \quad \text{(Equations 14)}$$

According to Equations 6 and 14, the luminance signal $Y_{01}$ and the color difference signals $Cr_{01}$ and $Cb_{01}$ are expressed by Equations 15:

$$Y_{01} = (W_{12} + Ye_{01} + Cy_{11} + G_{02})/8 \quad \text{(Equations 15)}$$
$$Cr_{01} = B_{01} - Y_{01}$$
$$= (3W_{12} + 3Ye_{01} - 5Cy_{11} - 5G_{02})/8$$
$$Cb_{01} = R_{01} - Y_{01}$$
$$= (W_{00} - Ye_{01} + Cy_{11} - G_{10})/2 -$$
$$(W_{12} + Ye_{01} + Cy_{11} + G_{02})/8$$

Therefore, in this case also, the luminance signal $Y_{01}$ and the color difference signals $Cr_{01}$ and $Cb_{01}$, which are the outputs at the lattice point, are linear to the signals from the pixels W, Cy, Ye, and G as expressed in Equations 15. Consequently, the luminance signal $Y_{ij}$ and the color difference signals $Cr_{ij}$ and $Cb_{ij}$, which are the outputs at the lattice point (i,j), are generally expressed by Equations 11. The operations by the block forming circuit 62 and the data compressing circuit 64 are the same as in the case where the color complementary filter 52 is used.

Image filming and image compression of an object belong to different technical fields, so far having been developed separately from each other. As a result, connecting stand-alone devices was the only choice available to build a system incorporating both the technologies. Specifically, to build a comprehensive system with the image filming apparatus 51 and the image data compression apparatus 61, output of the image filming apparatus 51, i.e. the luminance signal Y and the color difference signals Cr and Cb, was coupled to input of the image data compression apparatus 61.

However, such a conventional system configuration has a problem in that the color separation process for the image filming apparatus 51 to generate the luminance signal Y and the color difference signals Cr and Cb takes time, which leads to an overall longer period of time required for the system to manage the processing and reduces the efficiency in external transmission of image data.

Also, since the image filming apparatus 51 needs to be provided therein with a space (capacity) to accommodate the color separator circuit 54, it is difficult to attempt to reduce the size of the combined system of the image filming apparatus 51 and the image data compression apparatus 61.

Moreover, as mentioned earlier, the configuration disclosed in Japanese Laid-Open Patent Application No. 7-67129/1995 generates the color difference signals Cr and Cb by separating image signal output of a CCD into a luminance signal and color signals with a Y/C separator circuit and then conducting a matrix calculation on the luminance and color signals. Therefore, the process up to the compression of the image data output of the CCD is complex and time-consuming.

SUMMARY OF THE INVENTION

In view of the problems, an object of the present invention is to provide an image filming and compression system that is smaller in size than conventional counterparts, and which is capable of offering better efficiency in processes from filming images of an object to compressing the image data obtained by the image filming.

In order to accomplish the object, an image filming and compression system in accordance with the present invention, includes
  a filter member including a plurality of color filters arranged in a predetermined arrangement;
  a solid state image sensor, including a plurality of pixels corresponding to the plurality of color filters, for filming an object via the filter member and outputting an electric signal from the plurality of pixels as image data according to an amount of light received;

block forming section for dividing all the image data outputted by the solid state image sensor into blocks corresponding to the plurality of pixels according to the arrangement of the plurality of color filters constituting the filter member; and image data converter section for calculating spatial frequency components of a luminance signal and a color difference signal for each block according to the image data obtained from the block forming section, wherein the image data converter section calculates the spatial frequency components of the luminance signal and the color difference signal by conducting the only linear transformation on the image data in each block.

With the configuration, the solid state image sensor receives light from an object via the filter member and outputs an electric signal from the plurality of pixels as image data according to an amount of light received. All the image data outputted by the solid state image sensor is divided by the block forming section into blocks. The image data in each block is converted into the spatial frequency components of the luminance signal and the color difference signal essential for a process of compressing the image data by the image data converter section conducting the only linear transformation.

In other words, with the configuration, the spatial frequency components of the luminance signal and the color difference signal are calculated directly according to the image data from the solid state image sensor, not according to luminance signal and the color difference signal.

This obviates the need for a device to generate a luminance signal and a color difference signal according to the image data and means to generate a luminance signal and the color signal, making the configuration of the image filming and compression system simpler and facilitating the mounting of the whole system on one chip and thus the reduction in the size. In addition, the time to generate a luminance signal and a color difference signal and the time to generate a luminance and a color signal can be completely reduced. Consequently, it becomes possible to conduct the processes from the image filming of the object to the compression of the image data in a short period of time and with high efficacy.

For a fuller understanding of the nature and advantages of the invention, reference should be made to the ensuing detailed description taken in conjunction with the accompanying drawings.

BRIEF DESCRIPTION OF THE DRAWINGS

FIG. 2 is an explanatory drawing showing image data output of the CCD shown in FIG. 1 being arranged in blocks according to a color arrangement of a filter member used.

FIG. 4 is an explanatory drawing showing image data output of the CCD being arranged in blocks according to pixels when the filter member is used.

FIG. 6 is an explanatory drawing showing image data output of the CCD being arranged in blocks according to a color arrangement of a filter member used.

FIG. 9 is a plan view showing a configuration example of the filter member.

FIG. 11 is a plan view showing another configuration example of the filter member.

DESCRIPTION OF THE EMBODIMENTS

Figure 1:
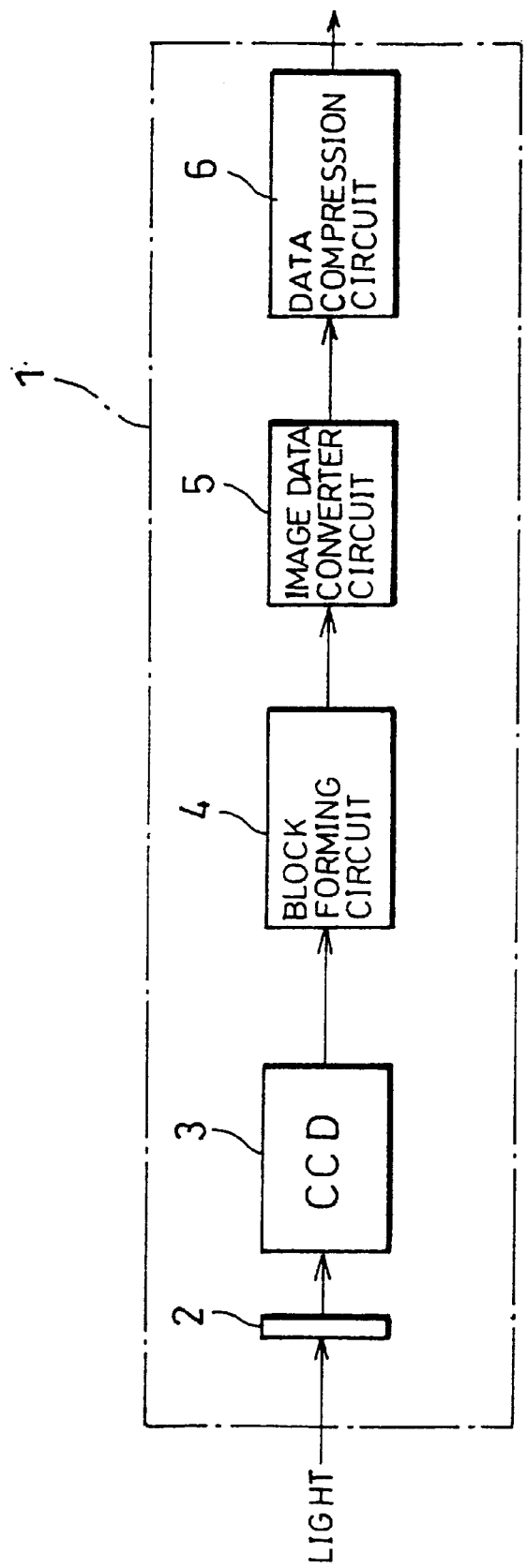
FIG. 1 is a block diagram showing a configuration example of an image filming and compression system of an embodiment in accordance with the present invention.

Referring to FIGS. 1 and 2, the following description will discuss an embodiment in accordance with the present invention.

As shown in FIG. 1, an image filming and compression system 1 includes a color complementary filter (filter member) 2, a CCD (solid state image sensor) 3, a block forming circuit (block forming means) 4, an image data converter circuit (image data converter means) 5, and a data compressing circuit 6.

FIG. 9 shows an example of a configuration of the color complementary filter 2, in which Ma (magenta), Ye (yellow), Cy (cyan), and G (green) color filters are arranged according to an arrangement called a field-sequential color difference array. The color complementary filter 2 is placed before the CCD 3 so that light from an object passes through the color complementary filter 2 and then enters the CCD 3.

Widely known arrangements of color complementary filters other than the one above include frame-sequential color difference arrays, MOS-type arrays, frame interleave arrays, etc.

The CCD 3 receives light that travels from the object via the color complementary filter 2 and generates electric signals for output according to the amount of light received. The CCD 3 includes a light receiving element (pixel) for each color filter of the color complementary filter 2. The output of the light receiving element is coupled to the input of the block forming circuit 4 as image data. The image data is generally expressed in 8 bits.

The filter member used dictates which method is to be adopted to read the data produced by the pixels of the CCD 3. Namely, these may be a total independent pixel reading method, a two line addition reading method, a two line independent reading method, or other methods. The total independent pixel reading method reads a signal from every other pixel in a vertical direction, and reads, in a next field, signals from the pixels that have been missed in the previous field. The two line addition reading method reads the added signals from vertically adjacent pixels, and reads, in a next field, added signals from a different vertical combination of pixels. The two line independent reading method reads independent signals from two vertically adjacent pixels, and reads, in a next field, independent signals from a different vertical combination of pixels.

The block forming circuit 4 is for dividing all the image data output of the CCD 3 into blocks corresponding to the pixels according to the arrangement of the color filters constituting the color complementary filter 2. In the present embodiment, the block forming circuit 4 forms blocks with the whole of the image data so that horizontally adjacent blocks share common image data of a predetermined column and vertically adjacent blocks share common image data of a predetermined row. In the present embodiment, the predetermined column is a column on a vertical edge of the block, and the predetermined row is a row on a horizontal edge of the block.

Here, the spatial frequency components of the luminance signal Y and the color difference signals Cr and Cb are obtained according to the image data from the adjacent pixels. Therefore, regardless of the kind of the filter member used, the spatial frequency components of the luminance signal Y and the color difference signals Cr and Cb are surely generated with the common image data even on an edge of the block by sharing the common image data in the predetermined column and row between the adjacent blocks.

Specifically, as shown in FIG. 2, the block forming circuit 4 forms blocks with all the image data output of the CCD 3 so that the image data corresponding to the pixels in the $(8 \times a+1)$-th column of the CCD 3 in a predetermined block also belongs to the block horizontally adjacent to that predetermined block and, that the image data corresponding to the pixels in the $(16 \times b+1)$-th and $(16 \times b+2)$-th rows of the CCD 3 in a predetermined block also belongs to the block vertically adjacent to that predetermined block, where a and b are natural numbers.

If JPEG is employed for image compression, for example, blocks are made from the luminance signal Y and the color difference signals Cr and Cb with 8 horizontal signals×8 vertical signals as a unit. Conceptually, taking the color arrangement of the color complementary filter 2 into account, the block forming circuit 4 of the present embodiment forms the block with 8+1=9 horizontal signals and 2×(8+1)=18 vertical signals as a unit to obtain the same number of the spatial frequency components of the luminance signal Y and the color difference signals Cr and Cb as these. This ensures the generation of the spatial frequency components of the luminance signal Y and the color difference signals Cr and Cb for each block.

The common image data shared between the adjacent blocks is stored on a memory device (not shown).

The image data converter circuit 5 is for calculating the data (DCT coefficients) on the spatial frequency components of the luminance signal Y and the color difference signals Cr and Cb by conducting a linear transformation on the image data output of the pixels of the CCD 3 for each block formed by the block forming circuit 4. No other linear transformation is conducted in the image filming and compression system. The principle in the calculation of the DCT coefficients will be explained later.

The data compression circuit 6 quantizes the DCT coefficients generated by the image data converter circuit 5, zigzag-scans the quantized DCT coefficients, and carries out a run length encoding and a Huffman coding.

The following description will explain operations of the image filming and compression system 1 of the present embodiment.

As light from an object passes through a predetermined color filter of the color complementary filter 2 and enters the CCD 3, the light receiving element having received the light at the CCD 3 transmits, to the block forming circuit 4, image data corresponding to the amount of light received. Then the block forming circuit 4 divides all the image data input into blocks each having image data for 9×18 pixels. The image data shared between adjacent blocks is stored on a memory device. The image data converter circuit 5 conducts the only linear transformation on the image data for each block, using also the image data stored on the memory device, and calculates the data on the spatial frequency components of the luminance signal Y and the color difference signals Cr and Cb. Thereafter, the data compression circuit 6 quantizes the DCT coefficients generated by the image data converter circuit 5, zigzag-scans the quantized DCT coefficients, carries out a run length encoding and a Huffman coding, and transmits the compressed data externally.

The linear transformation conducted by the image data converter circuit 5 is the only and one-time linear transformation conducted in the image filming and compression system 1.

The following description will explain the principle in the calculation of the spatial frequency components of the luminance signal Y and the color difference signals Cr and Cb according to the image data output of the pixels of the CCD 3. The same definitions as those mentioned earlier are applied to i, j, p, and q.

If the color complementary filter 2 having the color arrangement shown in FIG. 9 is used, assuming that the luminance signal Y and the color difference signals Cr and Cb are outputted at the lattice point formed by four adjacent pixels, as already explained in the Background of the Invention above, the luminance signal $Y_{ij}$ and the color difference signals $Cr_{ij}$ and $Cb_{ij}$ are expressed by Equations 11 using matrixes $E^Y_{ijpq}$, $E^{Cr}_{ijpq}$, $E^{Cb}_{ijpq}$ and the output $X_{pq}$ of the pixel X, where, however, i and j each are any of the integral numbers from 0 through 7, p is any one of the integral numbers from 0 through 17, and q is any one of integral numbers from 0 through 8.

Meanwhile, the spatial frequency components $Y_{mn}$, $Cr_{mn}$, and $Cb_{mn}$ of the luminance signal $Y_{ij}$ and the color difference signals $Cr_{ij}$ and $Cb_{ij}$ are expressed by Equations 12 using the matrix $F_{mnij}$, the luminance signal $Y_{ij}$, and the color difference signals $Cr_{ij}$ and $Cb_{ij}$.

Therefore, from Equations 11 and 12, the spatial frequency components $Y_{mn}$, $Cr_{mn}$, and $Cb_{mn}$ of the luminance signal $Y_{ij}$ and the color difference signals $Cr_{ij}$ and $Cb_{ij}$ are expressed by Equations 16 using the $X_{pq}$:

$$Y_{mn} = \sum_{i,j,p,q} F_{mnij} \cdot E^Y_{ijpq} \cdot X_{pq}$$

$$Cr_{mn} = \sum_{i,j,p,q} F_{mnij} \cdot E^{Cr}_{ijpq} \cdot X_{pq}$$

$$Cb_{mn} = \sum_{i,j,p,q} F_{mnij} \cdot E^{Cb}_{ijpq} \cdot X_{pq}$$

(Equations 16)

Here, since the matrixes $E^Y_{ijpq}$, $E^{Cr}_{ijpq}$, and $E^{Cb}_{ijpq}$ in Equations 11 and the matrix $F_{mnij}$ in Equations 12 all represent linear transformations, Equations 16 are expressed using unit matrixes $W^Y_{mnpq}$, $W^{Cr}_{mnpg}$, and $W^{Cb}_{mnpq}$ as Equations 17:

$$Y_{mn} = \sum_{p,q} W^Y_{mnpq} \cdot X_{pq}$$

$$Cr_{mn} = \sum_{p,q} W^{Cr}_{mnpq} \cdot X_{pq}$$

$$Cb_{mn} = \sum_{p,q} W^{Cb}_{mnpq} \cdot X_{pq}$$

(Equations 17)

In short, the spatial frequency components $Y_{mn}$, $Cr_{mn}$, and $Cb_{mn}$ of the luminance signal $Y_{ij}$ and the color difference signals $Cr_{ij}$ and $Cb_{ij}$ are obtained by the image data converter circuit 5 conducting the only linear transformation on the output $X_{pq}$ of the pixel X using the matrixes $W^Y_{mnpq}$, $W^{Cr}_{mnpq}$, and $W^{Cb}_{mnpq}$ as in Equations 17.

The component numbers constituting the matrixes $W^Y_{mnpq}$, $W^{Cr}_{mnpq}$, and $W^{Cb}_{mnpq}$ can be specifically obtained by the following calculation.

In the present embodiment, the matrix $E^Y_{ijpq}$ shown in Equations 11 is expressed by Equation 18. Note that $\delta$ in Equation 18 is not a variable with any meaning, but a constant to comprehensibly express the matrix $E^Y_{ijpq}$ with as few equations and presumptions as possible.

$$E^Y_{ijpq} = (\delta_{2i,p} \cdot \delta_{j,q} + \delta_{2i,p} \cdot \delta_{j+1,q} + \delta_{2i+1,p} \cdot \delta_{j,q} + \delta_{2i+1,p} \cdot \delta_{j+1,q})/7$$

(Equation 18)

however, $$\delta_{A,B} = \begin{cases} 1 & (\text{when } A = B) \\ 0 & (\text{when } A \neq B) \end{cases}$$

Meanwhile, from the Equations 8, the color difference signal $Cr_{ij}$ is expressed by Equation 19:

$$Cr_{ij} = -(3/10)Y_{ij} + (4/10)C^1_{ij} - (1/10)C^2_{ij}$$

(Equation 19)

In addition, the color difference signals $C^1_{ij}$ and the $C^2_{ij}$ are expressed by Equations 20. Note that $\epsilon$ in Equations 20 is not a variable with any meaning, but a constant to comprehensibly express the color difference signals $C^1_{ij}$ and the $C^2_{ij}$ with as few equations and presumptions as possible.
when i is an odd number $$C^1_{ij} = C^1_{i+1,j}$$

when i is an even number $$C^1_{ij} = \epsilon_j \cdot (\delta_{2i,p} \cdot \delta_{j,q} - \delta_{2i,p} \cdot \delta_{j+1,q} + \delta_{2i+1,p} \cdot \delta_{j,q} - \delta_{2i+1,p} \cdot \delta_{j+1,q}) \cdot X_{pq}$$

when i is an odd number $$C^2_{ij} = \epsilon_j \cdot (\delta_{2i,p} \cdot \delta_{j,q} - \delta_{2i,p} \cdot \delta_{j+1,q} + \delta_{2i+1,p} \cdot \delta_{j,q} - \delta_{2i+1,p} \cdot \delta_{j+1,q}) \cdot X_{pq}$$

when i is an odd number $$C^2_{ij} = C^2_{i+1,j}$$

(Equations 20)

however, $$\epsilon_j = \begin{cases} +1 & (\text{when } j = \text{odd number}) \\ -1 & (\text{when } j = \text{even number}) \end{cases}$$

From Equations 18 and 19, the matrix $E^{Cr}_{ijpq}$ of the present embodiment is expressed by Equations 21:
when i is an even number $$E^{Cr}_{ijpq} = -(3/10)E^Y_{ijpq} + (4/10) \cdot \{\epsilon_j \cdot (\delta_{2(i+1),p} \cdot \delta_{j,q} - \delta_{2(i+1),p} \cdot \delta_{j+1,q} + \delta_{2(i+1)+1,p} \cdot \delta_{j,q} - \delta_{2(i+1)+1,p} \cdot \delta_{j+1,q})\}$$

$$-(1/10) \cdot \{\epsilon_j \cdot (\delta_{2i,p} \cdot \delta_{j,q} - \delta_{2i,p} \cdot \delta_{j+1,q} + \delta_{2i+1,p} \cdot \delta_{j,q} - \delta_{2i+1,p} \cdot \delta_{j+1,q})\}$$

when i is an odd number $$E^{Cr}_{ijpq} = -(3/10)E^Y_{ijpq} + (4/10) \cdot \{\epsilon_j \cdot (\delta_{2i,p} \cdot \delta_{j,q} - \delta_{2i,p} \cdot \delta_{j+1,q} + \delta_{2i+1,p} \cdot \delta_{j,q} - \delta_{2i+1,p} \cdot \delta_{j+1,q})\}$$

$$-(1/10) \cdot \{\epsilon_j \cdot (\delta_{2(i+1),p} \cdot \delta_{j,q} - \delta_{2(i+1),p} \cdot \delta_{j+1,q} + \delta_{2(i+1)+1,p} \cdot \delta_{j,q} - \delta_{2(i+1)+1,p} \cdot \delta_{j+1,q})\}$$

(Equations 21)

Meanwhile, from Equations 8, the color difference signal $Cb_{ij}$ is expressed by Equation 22:

$$Cb_{ij} = -(3/10)Y_{ij} - (1/10)C^1_{ij} + (4/10)C^2_{ij}$$

(Equation 22)

Consequently, from Equations 18, 20, and 22, the matrix $E^{Cb}_{ijpq}$ of the embodiment is expressed by Equations 23:
when i is an even number $$E^{Cb}_{ijpq} = -(3/10)E^Y_{ijpq} - (1/10) \cdot \{\epsilon_j \cdot (\delta_{2(i+1),p} \cdot \delta_{j,q} - \delta_{2(i+1),p} \cdot \delta_{j+1,q} + \delta_{2(i+1)+1,p} \cdot \delta_{j,q} - \delta_{2(i+1)+1,p} \cdot \delta_{j+1,q})\}$$

$$+ (4/10) \cdot \{\epsilon_j \cdot (\delta_{2i,p} \cdot \delta_{j,q} - \delta_{2i,p} \cdot \delta_{j+1,q} + \delta_{2i+1,p} \cdot \delta_{j,q} - \delta_{2i+1,p} \cdot \delta_{j+1,q})\}$$

when i is an odd number $$E^{Cb}_{ijpq} = -(3/10)E^Y_{ijpq} - (1/10) \cdot \{\epsilon_j \cdot (\delta_{2i,p} \cdot \delta_{j,q} - \delta_{2i,p} \cdot \delta_{j+1,q} + \delta_{2i+1,p} \cdot \delta_{j,q} - \delta_{2i+1,p} \cdot \delta_{j+1,q})\}$$

$$+ (4/10) \cdot \{\epsilon_j \cdot (\delta_{2(i+1),p} \cdot \delta_{j,q} - \delta_{2(i+1),p} \cdot \delta_{j+1,q} + \delta_{2(i+1)+1,p} \cdot \delta_{j,q} - \delta_{2(i+1)+1,p} \cdot \delta_{j+1,q})\}$$

(Equations 23)

Therefore, if the matrixes $E^Y_{ijpq}$, $E^{Cr}_{ijpq}$, and $E^{Cb}_{ijpq}$ obtained from Equations 18, 21, and 23, are multiplied by the matrix representing the DCT transformation $F_{mnij}$ of Equation 1, all the component numbers for the matrixes $W^Y_{mnpq}$, $W^{Cr}_{mnpq}$, and $W^{Cb}_{mnpq}$ are specifically obtained.

With the above arrangement, the spatial frequency components of the luminance signal Y and the color difference signals Cr and Cb, which are necessary for the compression of image data, are calculated not according to the luminance signal Y and the color difference signals Cr and Cb, but directly according to the image data output of the CCD 3.

This obviates the need for a conventional color separator circuit and means for generating the luminance and color signals to generate the luminance signal Y and the color difference signals Cr and Cb according to the image data, making the configuration of the image filming and compression system 1 simpler and facilitating the mounting of the whole system on one chip and thus the reduction in the overall size. In addition, the time to generate the luminance signal Y and the color difference signals Cr and Cb and the time to generate the luminance and color signals can be completely reduced. Consequently, it becomes possible to conduct the processes from the image filming of the object to the compression of the image data in a short time and with high efficacy.

Figure 3:
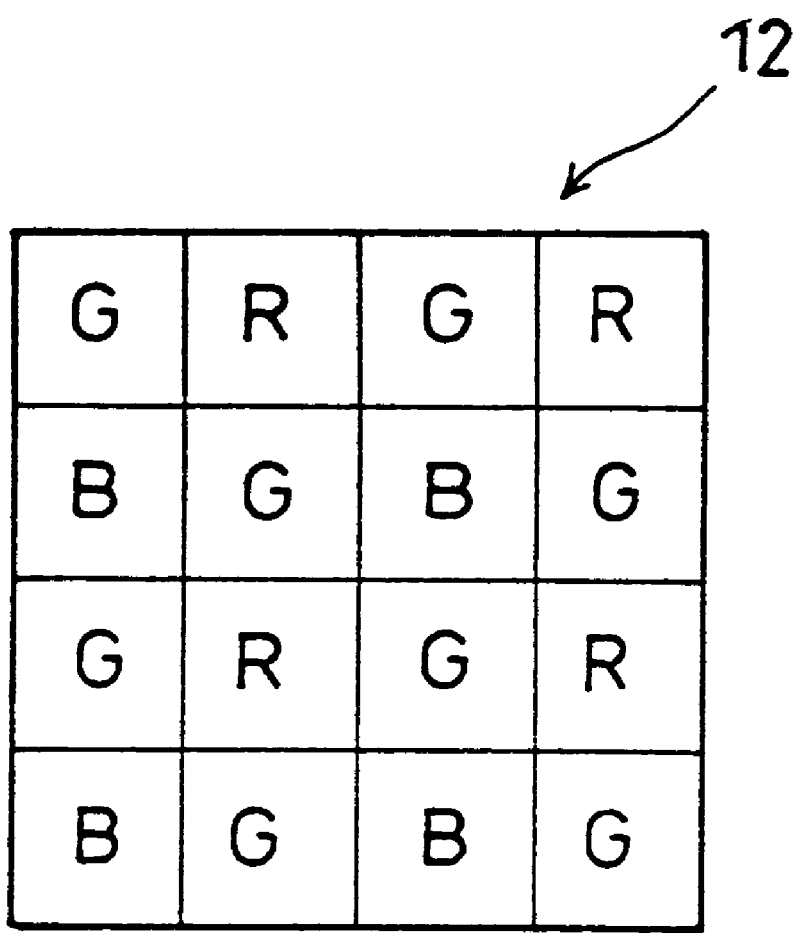
FIG. 3 is a plan view showing a configuration example of the filter member shown in FIG. 1.
Figure 4:
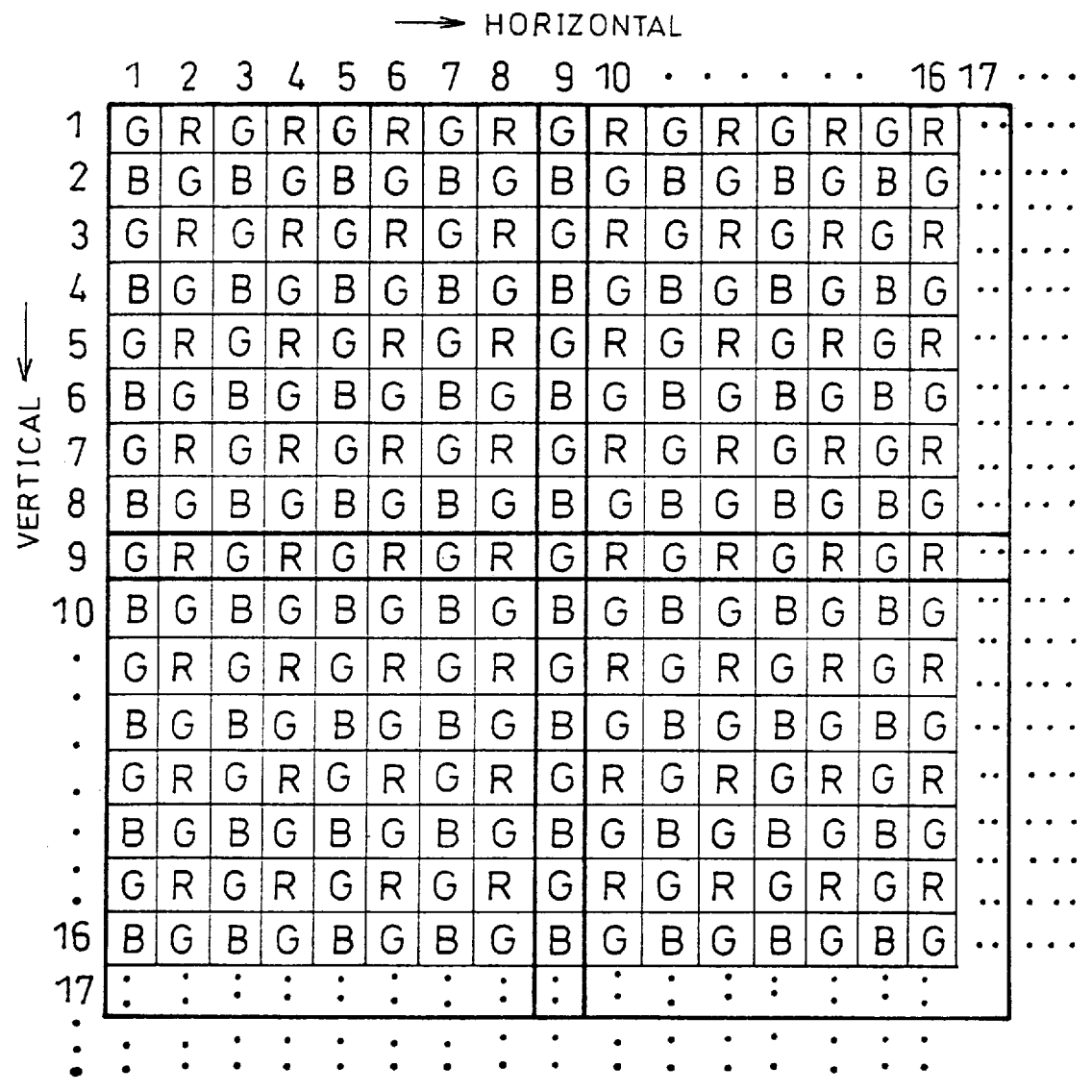
Figure 5:
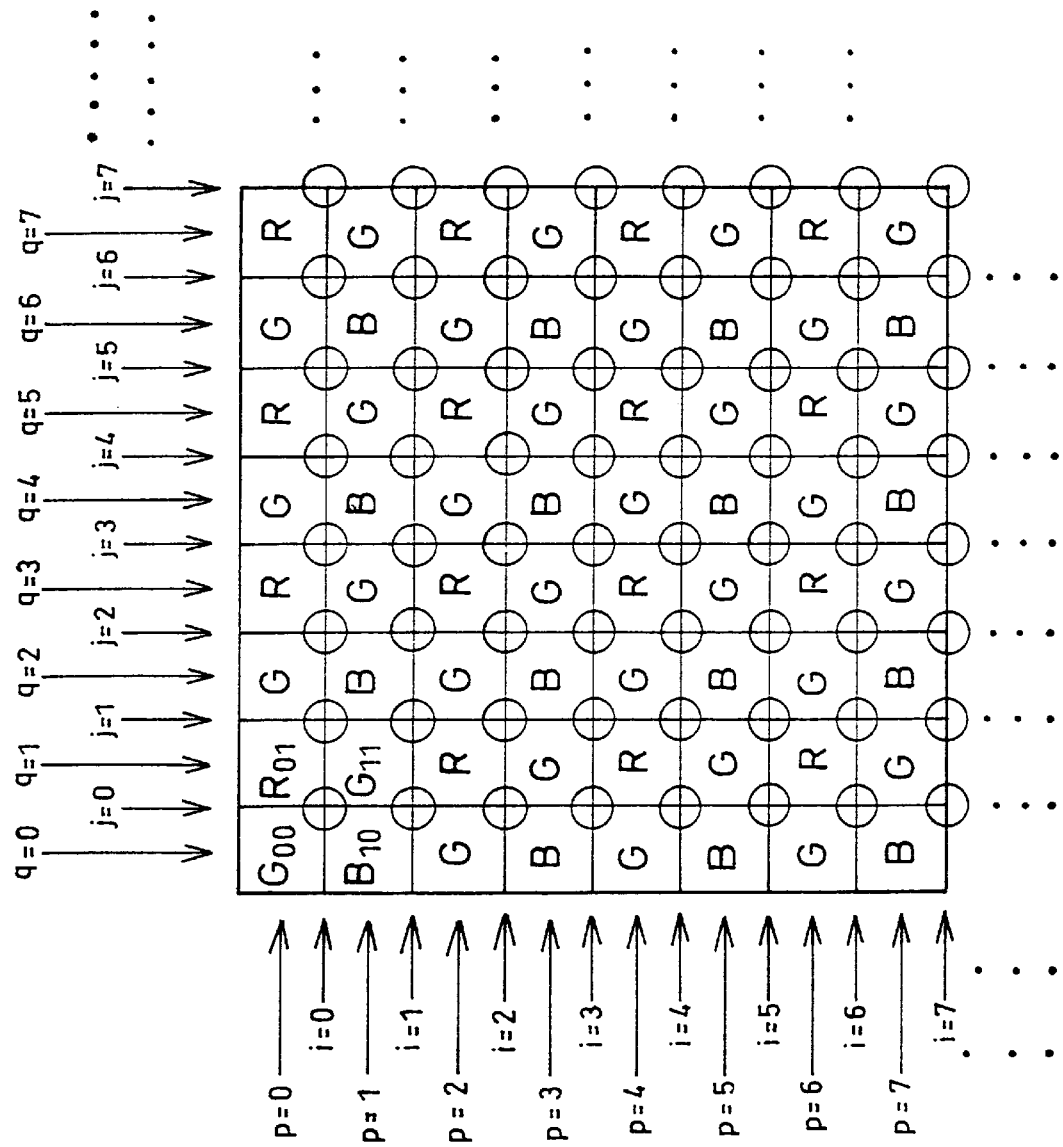
FIG. 5 is an explanatory drawing showing a geographical relation between the pixels of the CCDs that are in accordance with the color arrangement of the filter member and lattice points at which it is assumed conceptually that a luminance signal and color difference signals are outputted based on the image data output of the pixels.

Referring to FIGS. 3 through 5, the following description will discuss another embodiment in accordance with the present invention. In the present embodiment, an example will be explained which adopts a primary color filter (filter member) 12, in place of the color complementary filter 2, in the image filming and compression system 1 detailed in the first embodiment. The primary color filter 12 is constituted by R, G, and B primary color filters as shown in FIG. 3. The present embodiment has the same configuration as the first embodiment except for the primary color filter 12. Therefore, for convenience, members of the present embodiment that have the same arrangement and function as members of the previous embodiment are indicated by the same reference numerals and description thereof is omitted.

As shown in FIG. 3, the primary color filter 12 is configured to include R, G, and B primary color filters being arranged according to, for example, a Bayer array. Other known arrangements include interline arrays and stripe arrays.

Therefore, according to the color arrangement of the primary color filter 12, the block forming circuit 4 forms blocks with all the image data output of the CCD 3 so that the image data corresponding to the pixels in the (8×a+1)-th column of the CCD 3 in a predetermined block also belongs to the block horizontally adjacent to that predetermined block and that the image data corresponding to the pixels in the (8×b+1)-th row of the CCD 3 in a predetermined block also belongs to the block vertically adjacent to that predetermined block, where a and b are natural numbers.

Conceptually, as shown in FIG. 4, the block forming circuit 4 divides all the image data output of the CCD 3 into blocks with 8+1=9 horizontal signals and 8+1=9 vertical signals as a unit to obtain the spatial frequency components of the luminance signal Y and the color difference signals Cr and Cb of 8 horizontal signals×8 vertical signals. This ensures the generation of the spatial frequency components of the luminance signal Y and the color difference signals Cr and Cb for each block.

In a case where the primary color filter 12 is used, since the data of the pixels of the CCD 3 are read in a total independent pixel reading method, the lattice points exist in every rows as shown in FIG. 5 unlike the case where the color complementary filter 2 is used.

So the luminance signal $Y_{00}$ and the color difference signals $Cr_{00}$ and $Cb_{00}$ are expressed by Equations 24 using the R, G, and B signals:

$$Y_{00}=(G_{00}+R_{01}+B_{10}+G_{11})/4$$

$$Cr_{00}=\{3(R_{01}-G_{00})-(B_{10}-G_{11})\}/4$$

$$Cb_{00}=\{3(B_{10}-G_{11})-(R_{01}-G_{00})\}/4 \quad \text{(Equations 24)}$$

The luminance signal $Y_{00}$ and the color difference signals $Cr_{00}$ and $Cb_{00}$ are linear to the R, G, and B signals as shown in FIG. 24. Therefore, the luminance signal $Y_{ij}$ and the color difference signals $Cr_{ij}$ and $Cb_{ij}$ are also generally expressed by Equations 11 using the matrixes $E^Y_{ijpq}$, $E^{Cr}_{ijpq}$, and $E^{Cb}_{ijpq}$.

The matrixes $E^Y_{ijpq}$, $E^{Cr}_{ijpq}$, and $E^{Cb}_{ijpq}$ of the present embodiment are expressed by Equations 25, where i and j each are any one of the integral numbers from 0 through 7, and p and q each are any one of the integral numbers from 0 through 8:

$$E^Y_{ijpq}=(\delta_{i,p}\cdot\delta_{j,q}-\delta_{i,p}\cdot\delta_{j+1,q}+\delta_{i+1,p}\cdot\delta_{j,q}+\delta_{i+1,p}\cdot\delta_{j+1,q})/4$$

when i is an even number $$E^{Cr}_{ijpq}=\{3\epsilon_j\cdot(\delta_{i,p}\cdot\delta_{j+1,q}-\delta_{i,p}\cdot\delta_{j,q})-\epsilon_j\cdot(\delta_{i+1,p}\cdot\delta_{j,q}-\delta_{i+1,p}\cdot\delta_{j+1,q})\}/4$$

$$E^{Cb}_{ijpq}=\{3\epsilon_j\cdot(\delta_{i+1,p}\cdot\delta_{j,q}-\delta_{i+1,p}\cdot\delta_{j+1,q})-\epsilon_j\cdot(\delta_{i,p}\cdot\delta_{j+1,q}-\delta_{i,p}\cdot\delta_{j,q})\}/4$$

when i is an odd number $$E^{Cr}_{ijpq}=\{3\epsilon_j\cdot(\delta_{i+1,p}\cdot\delta_{j+1,q}-\delta_{i+1,p}\cdot\delta_{j,q})-\epsilon_j\cdot(\delta_{i,p}\cdot\delta_{j,q}-\delta_{i,p}\cdot\delta_{j+1,q})\}/4$$

$$E^{Cb}_{ijpq}=\{3\epsilon_j\cdot(\delta_{i,p}\cdot\delta_{j,q}-\delta_{i,p}\cdot\delta_{j+1,q}-\epsilon_j\cdot(\delta_{i+1,p}\cdot\delta_{j+1,q}-\delta_{i+1,p}\cdot\delta_{j,q})\}/4 \quad \text{(Equations 25)}$$

however, $$\delta_{A,B} = \begin{cases} 1 & \text{(when } A = B\text{)} \\ 0 & \text{(when } A \neq B\text{)} \end{cases}$$

$$\epsilon_j = \begin{cases} +1 & \text{(when } j \text{ is an even number)} \\ -1 & \text{(when } j \text{ is an odd number)} \end{cases}$$

Therefore, the component factors of the matrixes $W^Y_{mnpq}$, $W^{Cr}_{mnpq}$, and $W^{Cb}_{mnpq}$ are specifically obtained by multiplying the matrixes $E^Y_{ijpq}$, $E^{Cr}_{ijpq}$, and $E^{Cb}_{ijpq}$ obtained from Equation 25 by the matrix representing the DCT transformation of Equation 1.

Figure 7:
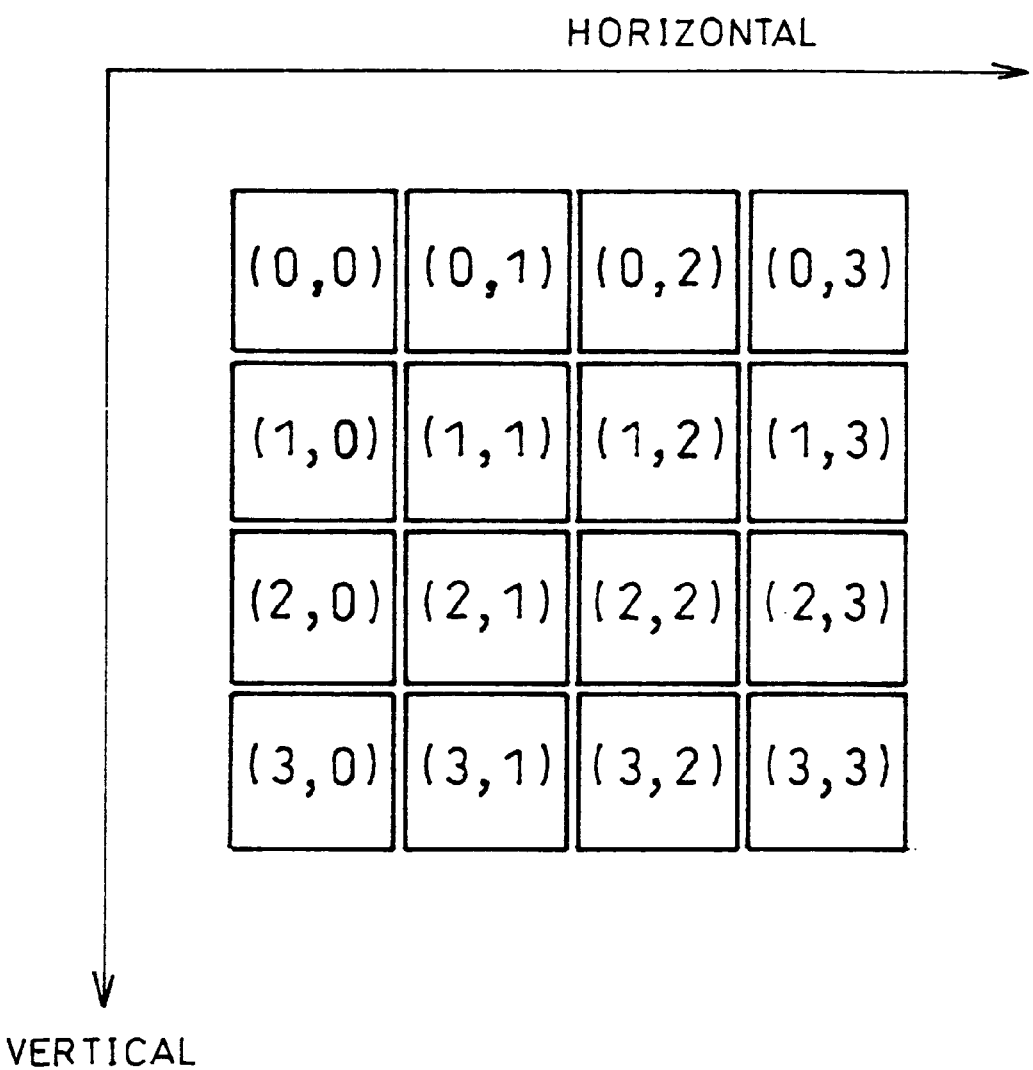
FIG. 7 is an explanatory drawing showing positions of spatial frequency components of the luminance signal and the color difference signals.
Figure 8:
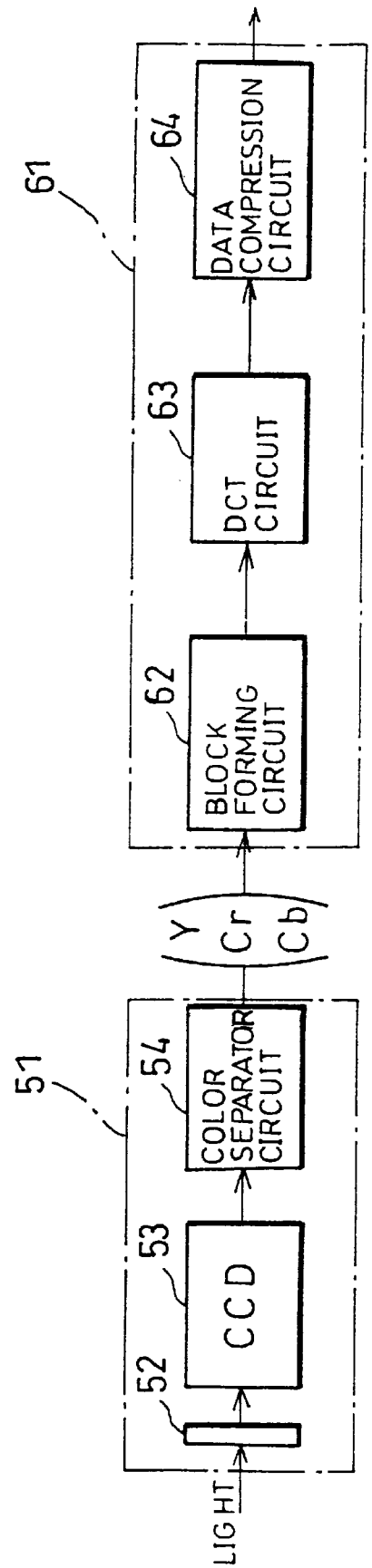
FIG. 8 is a block diagram showing a configuration example of a conventional system combining an image filming apparatus and an image data compression apparatus.
Figure 10:
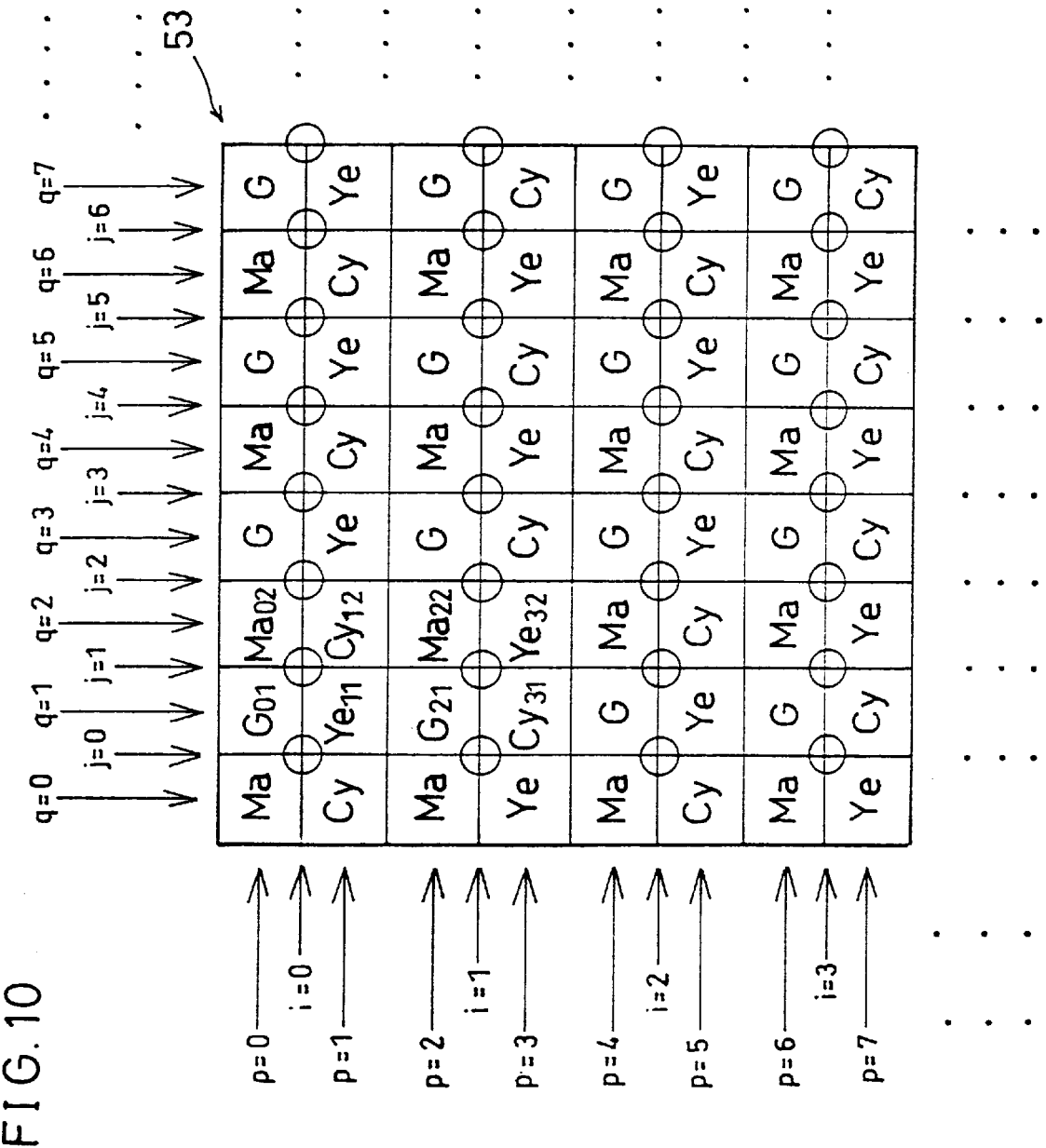
FIG. 10 is an explanatory drawing showing a geographical relation between the pixels of the CCDs that are in accordance with the color arrangement of the filter member and lattice points at which it is assumed conceptually that a luminance signal and color difference signals are outputted based on the image data output of the pixels.
Figure 12:
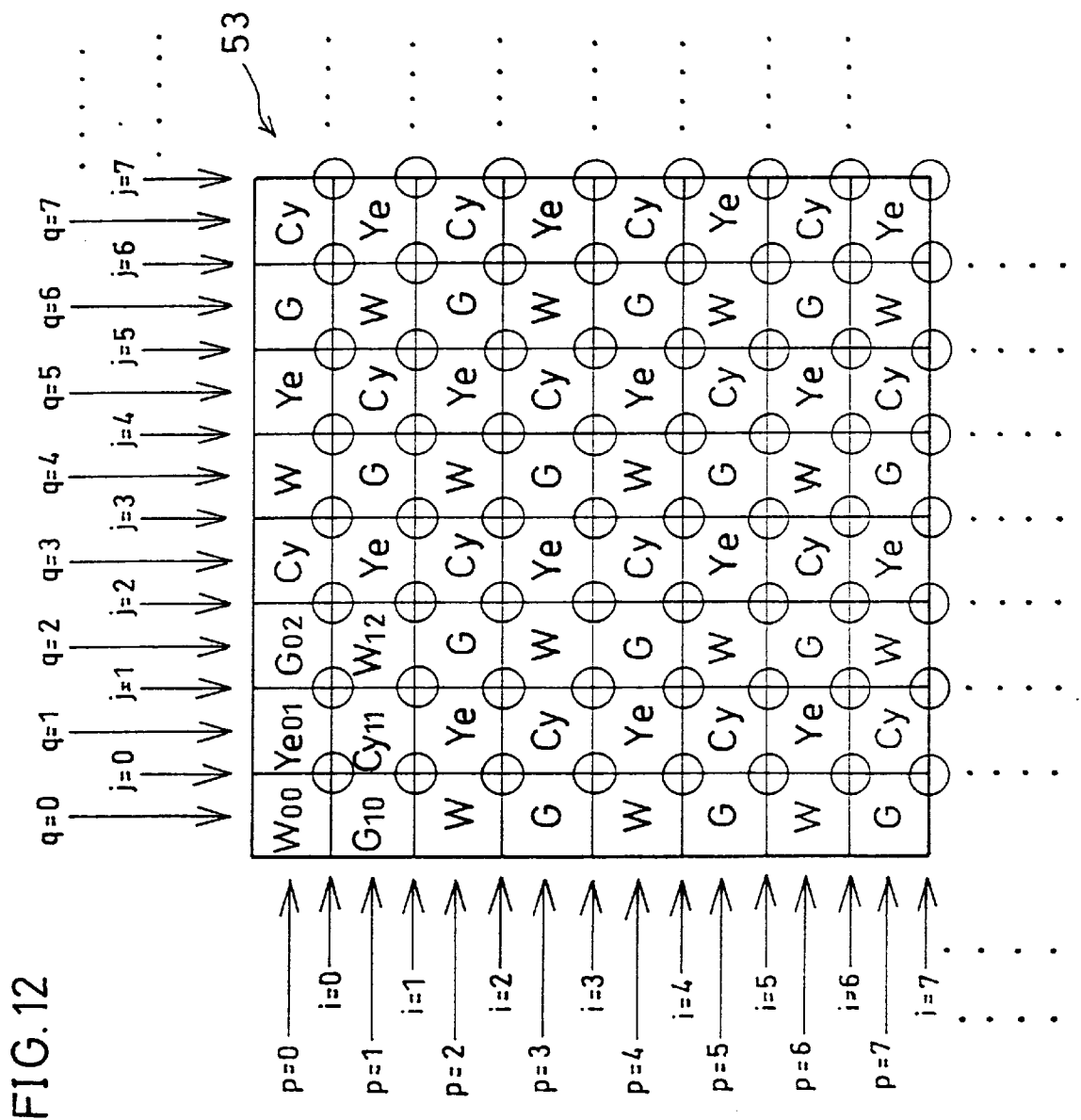
FIG. 12 is an explanatory drawing showing a geographical relation between the pixels of the CCDs that are in accordance with the color arrangement of the filter member and lattice points at which it is assumed conceptually that a luminance signal and color difference signals are outputted based on the image data output of the pixels.

Referring to FIGS. 6 and 7, the following description will discuss a further embodiment in accordance with the present invention. Here, for convenience, members of the present embodiment that have the same arrangement and function as members of the first or second embodiment are indicated by the same reference numerals and description thereof is omitted.

Figure 11:
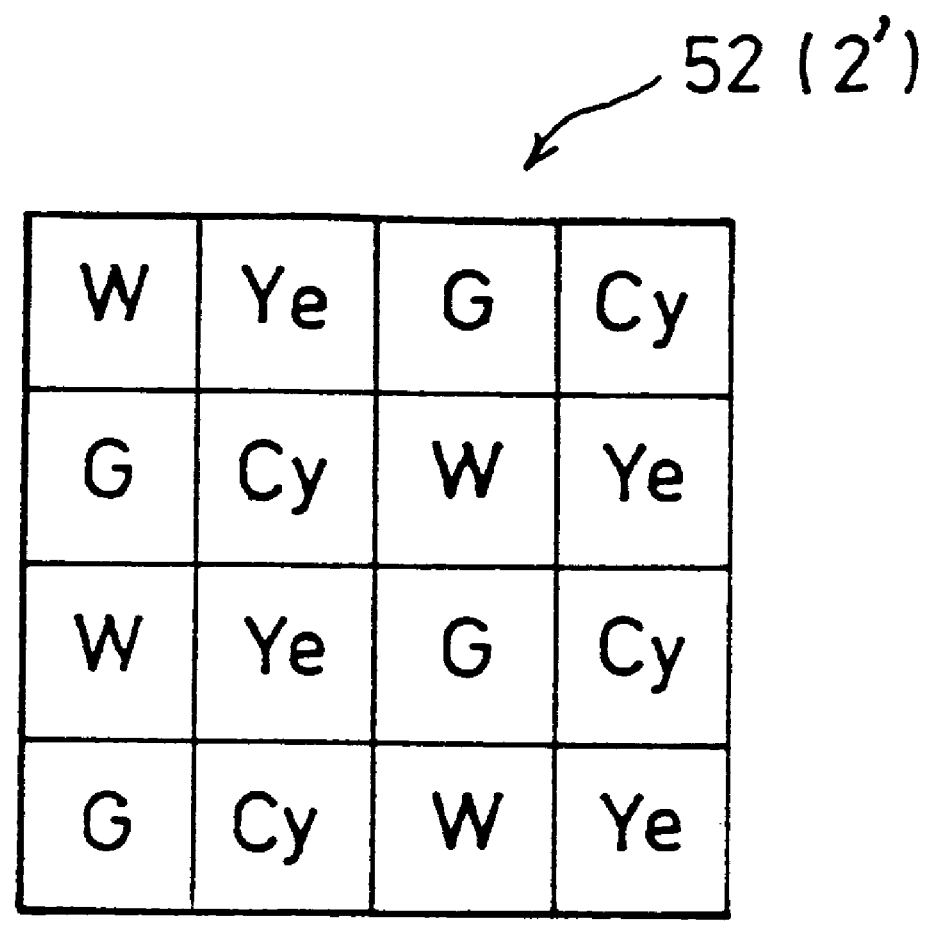

The present embodiment employs a color complementary filter 2', in place of the color complementary filter 2, in the image filming and compression system 1 detailed in the first embodiment. The color complementary filter 2' has W, Ye, Cy, and G color filters in a predetermined arrangement as shown in FIG. 11.

Here, as shown in FIG. 6, the block forming circuit 4 forms blocks with, for example, 4 horizontal signals×4 vertical signals as a unit so that no adjacent blocks, horizontally nor vertically, share image data. This obviates the need for a memory device to hold the common image data, such as the one explained in the first embodiment, and further simplifies the configuration of the system, facilitating further reduction of the system in size.

The image data converter circuit 5 calculates the spatial frequency components of the luminance signal Y and the color difference signals Cr and Cb so that the total number of the spatial frequency components of the luminance signal Y and the color difference signals Cr and Cb is equal to that of the image data outputted by the pixels of the CCD 3.

In other words, the components are arranged horizontally and vertically as shown in FIG. 7 when the luminance signal Y and the color difference signals Cr and Cb of the light entering the color complementary filter 2' are converted into the spatial frequency components with the DCT transformation for every block of 4×4. Here, since 16 spatial frequency components are obtained for each of the luminance signal Y and the color difference signals Cr and Cb, the total number thereof (48) is thrice as many as that of the image data in a block (16).

However, in the present embodiment, the spatial frequency components of the luminance signal Y and the color difference signals Cr and Cb are calculated through the operation of the image data converter circuit 5 so that there are 14 spatial frequency components for the luminance signal Y, excluding, for example, the (3,2) and (3,1) components and also that there is one spatial frequency component, e.g. (0,0) component, for the color difference signals Cr and Cb (sometimes called direct current component or DC component).

Therefore, the number of the image data in a block (16) is equal to the total number of the spatial frequency components of the luminance signal Y and the color difference signals Cr and Cb (14+1+1=16), and conventional appearance of erroneous colors can be surely prevented.

Generally, natural light contain various components, and has an infinite freedom. When such light is received via a filter member, since there is a limit to the number of pixels of the filter member (the number of color filters), the number of the image signals (image data) outputted by the CCD 3 is also limited. The number of the image signals in such an event is of course equal to the number of pixels of the filter member. Consequently, it can be said that the CCD 3 expresses natural light having an infinite freedom with a limited number of signals in approximation.

Therefore, conceptually, it is assumed in the present embodiment that the freedom of the light entering the filter member is the same as that of the number of the pixels of the filter member, and that the signals outputted by the CCD 3 are expressed without reducing the freedom of the light entering the filter member.

Specifically, a block cut out by the block forming circuit 4 includes 4×4=16 signals, and hence a freedom of 16, and it is presumed that the 16 signals have the same freedom as the light entering the color complementary filter 2'. Under such a presumption, the following description will explain the principle in the calculation of the spatial frequency components of the luminance signal $Y_{ij}$ and the color difference signals $Cr_{ij}$ and $Cb_{ij}$ in the present embodiment.

A reverse conversion of Equations 12 should be conducted to convert the spatial frequency components of the luminance signal $Y_{ij}$ and the color difference signals $Cr_{ij}$ and $Cb_{ij}$ back to the original components in actual space. The reverse conversion is expressed by Equations 26:

$$Y_{ij} = \sum_{m,n} F^{-1}_{ijmn} \cdot Y_{mn}$$

$$Cr_{ij} = \sum_{m,n} F^{-1}_{ijmn} \cdot Cr_{mn}$$

$$Cb_{ij} = \sum_{m,n} F^{-1}_{ijmn} \cdot Cb_{mn}$$

(Equations 26)

The luminance signal Y and color difference signals Cr and Cb, and the R, G, and B signals have a relation expressed by Equation 27:

$$\begin{pmatrix} R \\ G \\ B \end{pmatrix} = \begin{bmatrix} 1.0 & 0.0 & 1.4 \\ 1.0 & -0.3 & -0.7 \\ 1.0 & 1.8 & 0.0 \end{bmatrix} \begin{pmatrix} Y \\ Cr \\ Cb \end{pmatrix}$$

(Equation 27)

The R, G, and B signals and the W, Ye, Cy, and G signals have a relation expressed by Equation 28:

$$\begin{pmatrix} W \\ Ye \\ Cy \\ G \end{pmatrix} = \begin{bmatrix} 1 & 1 & 1 \\ 1 & 1 & 0 \\ 0 & 1 & 1 \\ 0 & 1 & 0 \end{bmatrix} \begin{pmatrix} R \\ G \\ B \end{pmatrix}$$

(Equation 28)

Here, since Equations 26, 27 and 28 all express linear relations, it is possible to express the relations comprehensively by Equations 29 below, where p=0 to 3, q=0 to 3, and $C_{cmn}$ on the right side denotes a spatial frequency component $Y_{mn}$ of the luminence signal $Y_{ij}$ when c=0, a spatial frequency component $Cr_{mn}$ of the color difference signal $Cr_{ij}$ when c=1, and a spatial frequency component $Cb_{mn}$ of the color difference signal $Cb_{ij}$ when c=2.

$$X_{pq} = W^{-1}_{pqcmn} \cdot C_{cmn}$$

(Equation 29)

however, $C_{0mn} = Y_{mn}$ (m, n=0,1,2,3)

$C_{1mn} = Cr_{mn}$ (m, n=0,1,2,3)

$C_{2mn} = Cb_{mn}$ (m, n=0,1,2,3)

and $C_{1mn} = C_{2mn} = 0$ (m≠0 or n≠0)

$C_{031} = C_{032} = 0$

Therefore, in the present embodiment, the image data converter circuit 5 conducts the reverse conversion of Equations 29 on the image data obtained from the CCD 3. Table 1 shows specific component factors of $W_{pqcmn}$, the reverse conversion of $W^{-1}_{pqcmn}$.

TABLE 1

| | | | |
|---|---|---|---|
| when c = 0, m = 0, and n = 0, | | | |
| 0.179036 | 0.336594 | 0.549998 | 0.119853 |
| 0.410412 | 0.0409463 | 0.126431 | 0.564201 |
| 0.19653 | 0.459054 | 0.620707 | −0.0642023 |
| 0.462893 | 0.163407 | 0.15 | 0.380146 |
| when c = 0, m = 0, and n = 1, | | | |
| 0.24031 | 0.129496 | −0.315035 | −0.332444 |
| 0.489961 | 0.14931 | −0.0544404 | −0.31263 |
| 0.2722 | 0.121289 | −0.377876 | −0.340651 |
| 0.585632 | 0.141103 | −0.0753873 | −0.320837 |
| when c = 0, m = 0, and n = 2, | | | |
| 0.166666 | −0.25 | −0.500002 | 0.25 |
| 0.5 | −0.25 | −0.166667 | 0.25 |
| 0.166666 | −0.249999 | −0.5 | 0.250001 |
| 0.5 | −0.25 | −0.166667 | 0.25 |
| when c = 0, m = 0, and n = 3, | | | |
| 0.14464 | −0.340651 | 0.546004 | −0.14931 |
| −0.123692 | −0.292816 | 0.304091 | −0.101474 |
| 0.22163 | −0.360466 | 0.39429 | −0.169124 |
| 0.107278 | −0.31263 | 0.253519 | −0.121289 |
| when c = 0, m = 1, and n = 0, | | | |
| 0.217761 | 0.32664 | 0.653282 | 0.32664 |
| 0.270599 | 0.135299 | 0.0901996 | 0.135299 |
| −0.0901997 | −0.135299 | −0.270599 | −0.135299 |
| −0.653281 | −0.326641 | −0.21776 | −0.32664 |
| when c = 0, m = 1, and n = 1, | | | |
| 0.235702 | 0.146446 | −0.292893 | −0.353553 |
| 0.707108 | 0.146447 | −0.0976311 | −0.353553 |
| −0.235702 | −0.146447 | 0.292892 | 0.353553 |
| −0.707107 | −0.146447 | 0.0976313 | 0.353554 |

TABLE 1-continued

```
when c = 0, m = 1, and n = 2,
      0.180398     -0.270598    -0.541197    0.270598
      0.541197     -0.2705983   -0.180399    0.270597
     -0.180399      0.270598     0.541196   -0.270598
     -0.541196      0.270597     0.180399   -0.270598
when c = 0, m = 1, and n = 3,
      0.138071     -0.414214     0.828428   -0.207107
      0.0          -0.207106     0.138071    0.0
      0.0           0.207106    -0.414215    0.0
     -0.414213      0.414213    -0.276142    0.207107
when c = 0, m = 2, and n = 0
      0.166667      0.25         0.5         0.25
     -0.500001     -0.25        -0.166667   -0.249999
     -0.166667     -0.25        -0.5        -0.25
      0.500001      0.25         0.166666    0.25
when c = 0, m = 2, and n = 1,
      0.21776       0.135299    -0.270598   -0.32664
     -0.653282     -0.135299     0.0901993   0.326641
     -0.21776      -0.135299     0.270599    0.32664
      0.653281      0.135299    -0.0901996  -0.326641
when c = 0, m = 2, and n = 2,
      0.166667     -0.249999    -0.500001    0.25
     -0.500001      0.249999     0.166667   -0.25
     -0.166666      0.25         0.500002   -0.25
      0.5          -0.25        -0.166667    0.25
when c = 0, m = 2, and n = 3,
      0.0901995    -0.326641     0.653282   -0.135299
     -0.270599      0.326641    -0.21776     0.1353
     -0.0901995     0.326641    -0.653281    0.135299
      0.270599     -0.32664      0.21776    -0.135299
when c = 0, m = 3, and n = 0,
      0.0901995     0.135299     0.2706      0.135299
     -0.653282     -0.326641    -0.21776    -0.32664
      0.217761      0.32664      0.653282    0.32664
     -0.270598     -0.135299    -0.0901997  -0.135299
when c = 0, m = 3, and n = 3,
      0.0976315    -0.146446     0.292894   -0.146446
     -0.707107      0.353553    -0.235702    0.353553
      0.235702     -0.353554     0.707107   -0.353554
     -0.292894      0.146446    -0.0976313   0.146446
when c = 1, m = 0, and n = 0,
      0.180406     -0.370802    -0.624218    0.412302
     -1.30661       0.895191     0.502333   -0.995385
      0.435536     -0.895191    -1.507       0.995386
     -0.541219      0.370802     0.208073   -0.412301
when c = 2, m = 0, and n = 0,
      0.343077      0.193808    -0.442352   -0.487245
     -2.48478      -0.467896     0.355977    1.17632
      0.828257      0.467895    -1.06793    -1.17632
     -1.02923      -0.193808     0.147451    0.487245
```

Therefore, the spatial frequency components $Y_{mn}$, $Cr_{mn}$, and $Cb_{mn}$ of the luminance signal $Y_{ij}$ and the color difference signals $Cr_{ij}$ and $Cb_{ij}$ are obtained by conducting the only linear transformation shown in Table 1 on the image data output of the pixels of the CCD 3.

The image filming and compression system 1 detailed in the first, second, and third embodiments can be applied to, for example, a digital camera for holding compressed data on an internal memory device, a portable electronic information terminal for displaying compressed data, and a surveillance system or a video conferencing camera for transmitting compressed data to a main body (monitor) either via cable or wireless where the data is decompressed and displayed.

The processing program to obtain the spatial frequency components $Y_{mn}$, $Cr_{mn}$, and $Cb_{mn}$ of the luminance signal $Y_{ij}$ and the color difference signals $Cr_{ij}$ and $Cb_{ij}$ may be recorded on a recording medium such as a CD-ROM (Read Only Memory) or an FD (Floppy Disk).

Historically, there has been a presumption that an image filming apparatus is used in television system as a display device. Since the signal lines of television system are horizontally continuous, values for the luminance and color difference signals as output signal of the image filming apparatus were also outputted by horizontally continuous calculation (including low-pass filters and band-pass filters). For these reasons, the image filming apparatus presumed to be used for television system has no such a concept of two-dimensional areas such as the blocks of the invention.

As explained so far, the image filming and compression system in accordance with the present invention is characterized in that the block forming means (block forming circuit 4) forms blocks with all image data so that horizontally adjacent blocks share image data for a predetermined column and that vertically adjacent blocks share image data for a predetermined row.

The spatial frequency components of the luminance signal and the color difference signals are obtained according to image data from adjacent pixels. Therefore, if adjacent blocks share no image data, it is not possible at edges of the blocks to obtain the spatial frequency components of a luminance signal and color difference signals representative of the image data of the pixel at those locations.

So, by sharing the image data for a predetermined column and row between the adjacent blocks, the spatial frequency components of the luminance signal and the color difference signals can be surely generated using the shared image data even at edges of the blocks regardless of the kind of the filter member used.

Moreover, the image filming and compression system in accordance with the present invention is characterized in that the block forming means divides all the image data into blocks corresponding to 9 horizontal pixels×18 vertical pixels of the solid state image sensor (CCD 3).

With the configuration, when the filter member used has a color arrangement of, for example, a field-sequential color difference arrays, the spatial frequency components of the luminance signal and the color difference signals can be surely generated for each block.

Moreover, the image filming and compression system in accordance with the present invention is characterized in that the block forming means divides all the image data into blocks corresponding to 9 horizontal pixels×9 vertical pixels of the solid state image sensor.

With the configuration, when the filter member used has a color arrangement of, for example, a Bayer array, the spatial frequency components of the luminance signal and the color difference signals can be surely generated for each block.

Moreover, the image filming and compression system in accordance with the present invention is characterized in that the image data converter means (image data converter circuit 5) calculates the spatial frequency components of the luminance signal and the color difference signals so that the number of the image data outputted by the pixels of the solid state image sensor is equal to the total number of the spatial frequency components of the luminance signal and the color difference signals.

With the configuration, as a result of the operation by the image data converter means, the number of the image data from the solid state image sensor becomes equal to the total number of the spatial frequency components of the luminance signal and the color difference signals. Therefore, erroneous colors can be completely prevented from occurring with the configuration above, whereas conventionally erroneous colors were likely to occur because 3 kinds of signals, i.e. the luminance signal and the two kinds of color difference signals, are obtained, and as a result the number of the 3 kinds of signals is thrice as large as that of the image data from the pixels of the solid state image sensor.

Moreover, the image filming and compression system in accordance with the present invention is characterized in that the block forming means forms the blocks with all the image data so that horizontally adjacent blocks and vertically adjacent blocks share no image data.

With the configuration, since no image data is shared among the horizontally and vertically adjacent blocks, there is no need for a memory device to hold the common image data. This further simplifies the configuration of the system, and facilitates further reduction of the system in size.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image filming and compression system, comprising:
   a filter member including a plurality of color filters arranged in a predetermined arrangement;
   a solid state image sensor, including a plurality of pixels corresponding to the plurality of color filters, for filming an object via the filter member and outputting an electric signal from the plurality of pixels as image data according to an amount of light received;
   a block forming circuit for dividing all the image data outputted by the solid state image sensor into blocks corresponding to the plurality of pixels according to the arrangement of the plurality of color filters constituting the filter member; and
   an image data converter for calculating spatial frequency components of a luminance signal and a color difference signal for each block according to the image data obtained from the block forming circuit, wherein the image data converter calculates the spatial frequency components of the luminance signal and the color difference signal by conducting only linear transformation on the image data in each block.

2. The image filming and compression system as defined in claim 1, further comprising a data compression circuit for compressing the image data obtained from the image data converter.

3. The image filming and compression system as defined in claim 1, wherein the block forming circuit forms the blocks with all the image data so that horizontally adjacent blocks share image data for a predetermined column and so that vertically adjacent blocks share image data for a predetermined row.

4. The image filming and compression system as defined in claim 3, wherein the block forming circuit forms the blocks with all the image data, so that the horizontally adjacent blocks share the common image data for a column on a vertical edge of the block, and so that vertically adjacent blocks share the common image data for a row on a horizontal edge of the block.

5. The image filming and compression system as defined in claim 3, wherein the block forming circuit divides all the image data into blocks of 9 horizontal pixels×18 vertical pixels of the solid state image sensor.

6. The image filming and compression system as defined in claim 3, wherein the block forming circuit divides all the image data into blocks of 9 horizontal pixels×9 vertical pixels of the solid state image sensor.

7. The image filming and compression system as defined in claim 1,
   wherein the image data converter calculates the spatial frequency components of the luminance signal and the color difference signal so that the number of image data outputted in a block of the solid state image sensor is equal to the total number of the spatial frequency components of the luminance signal and the color difference signal.

8. The image filming and compression system as defined in claim 7, wherein the block forming circuit forms the blocks with all the image data so that horizontally adjacent blocks and vertically adjacent blocks share no image data.

9. An image filming and compression method, comprising the sequential steps of:
   (1) filming an object via a filter member including a plurality of color filters arranged in a predetermined arrangement with a solid state image sensor including a plurality of pixels corresponding to the plurality of color filters, and thus obtaining, from the plurality of pixels, an electric signal as image data according to an amount of light received;
   (2) dividing all the image data outputted by the solid state image sensor into blocks corresponding to the plurality of pixels according to the arrangement of the plurality of color filters constituting the filter member; and
   (3) calculating spatial frequency components of a luminance signal and a color difference signal for each block by conducting only linear transformation on the image data in each block.

10. A recording medium for storing a processing program for the image filming and compression method as defined in claim 9.

* * * * *